(12) United States Patent
Chernin (10) Patent No.: US 11,419,424 B2
(45) Date of Patent: Aug. 23, 2022

(54) CHAIR BACKREST ADJUSTMENT MECHANISM

(71) Applicant: Anatoli Chernin, Richmond Hill (CA)

(72) Inventor: Anatoli Chernin, Richmond Hill (CA)

(*) Notice: Subject to any disclaimer, the term of this patent is extended or adjusted under 35 U.S.C. 154(b) by 219 days.

(21) Appl. No.: 16/880,386

(22) Filed: May 21, 2020

(65) Prior Publication Data

US 2020/0383484 A1 Dec. 10, 2020

Related U.S. Application Data

(60) Provisional application No. 62/856,820, filed on Jun. 4, 2019.

(51) Int. Cl.
| | |
|---|---|
| *A61G 5/10* | (2006.01) |
| *A47C 7/40* | (2006.01) |
| *A47C 7/42* | (2006.01) |
| *F16B 2/06* | (2006.01) |

(52) U.S. Cl.
CPC ............... *A47C 7/402* (2013.01); *A47C 7/42* (2013.01); *A61G 5/1067* (2013.01); *F16B 2/065* (2013.01)

(58) Field of Classification Search
CPC .................................................. A61G 5/1067
See application file for complete search history.

(56) References Cited

U.S. PATENT DOCUMENTS

| 11,219,563 | B2* | 1/2022 | Li | A61G 5/1067 |
|---|---|---|---|---|
| 2006/0076814 | A1* | 4/2006 | Samila | A61G 5/12 |
| | | | | 297/354.12 |
| 2008/0157581 | A1* | 7/2008 | Whelan | A61G 5/1067 |
| | | | | 297/440.2 |
| 2008/0217880 | A1* | 9/2008 | Whelan | A61G 5/122 |
| | | | | 280/250.1 |
| 2015/0335502 | A1* | 11/2015 | Dufresne | A61G 5/122 |
| | | | | 297/284.2 |
| 2020/0206067 | A1* | 7/2020 | Hanson | A61G 5/14 |

FOREIGN PATENT DOCUMENTS

| CA | 3081216 A1 * | 12/2020 | A47C 7/402 |
|---|---|---|---|
| CN | 210494426 U * | 5/2020 | A61G 5/0833 |
| DE | 202018003805 U1 * | 11/2018 | |
| EP | 1772131 A1 * | 4/2007 | A61G 5/1067 |
| WO | WO-2017200392 A1 * | 11/2017 | A47C 7/42 |

* cited by examiner

*Primary Examiner* — Timothy J Brindley (57) ABSTRACT

An adjustment mechanism configured for adjusting a backrest of a chair, including a clamp element configured to be fixedly attached to a static frame, which extends along a longitudinal axis; a guided frame selectively moveably coupled to the clamp element and configured to be fixedly attached to the backrest, and wherein displacement of the guided frame relative to the clamp element is configured to urge corresponding displacement of the backrest either axially along a first axis extending generally transversely with respect to the longitudinal axis or angularly with respect to the longitudinal axis.

17 Claims, 8 Drawing Sheets

CHAIR BACKREST ADJUSTMENT MECHANISM

FIELD OF THE INVENTION

The present invention generally relates to adjustment mechanisms and particularly relates to adjustment mechanisms which enable a backrest of a chair to be adjustably positioned relative to a chair seat.

BACKGROUND OF THE INVENTION

It is well known to provide chairs, especially wheel chairs, with a backrest member capable of being horizontally and angularly adjusted in order to accommodate the varying physical configuration of individual users. A chair backrest is intended to provide support to a user's back and it oftentimes needs to be adjusted with respect to the chair seat. The adjustment of the backrest in wheel chairs is conventionally accomplished by means of special tools and the adjustment step is usually quite high, thus not allowing for fine adjustment of the backrest using the known adjustment mechanisms.

Fine adjustment is of utmost importance especially for immobile users, who utilize the chair on a constant basis.

It is also known that a separate adjustment mechanism is usually used for various adjustments in different planes of the backrest, such as an adjustment mechanism for adjusting the depth of the chair seat by linearly horizontally displacing the backrest, and a separate adjustment mechanism for adjusting the angle of the backrest relative to the chair seat by tilting the backrest.

It is appreciated that foldable wheel chairs require relatively small adjustment mechanisms that allow removal of the backrest and do not interfere with proper folding of the chair.

Thus, there is a need to provide an improved single adjustment mechanism for a chair backrest that allows manual adjustment of the backrest in several different planes without requiring any tools and having suitable dimensions to enable proper folding of the chair.

SUMMARY OF THE INVENTION

The present invention seeks to provide an improved chair backrest adjustment mechanism.

There is thus provided in accordance with an embodiment of the present invention an adjustment mechanism configured for adjusting a backrest of a chair, including a clamp element configured to be fixedly attached to a static frame, which extends along a longitudinal axis; a guided frame selectively moveably coupled to the clamp element and configured to be fixedly attached to the backrest, and wherein displacement of the guided frame relative to the clamp element is configured to urge corresponding displacement of the backrest either axially along a first axis extending generally transversely with respect to the longitudinal axis or angularly with respect to the longitudinal axis.

Preferably, the adjustment mechanism also includes at least two lead screws at least partially extending through the guided frame and extend along second and third axes, which are generally parallel to said axis; at least two guiding elements, each having an internally threaded bore; and wherein the guided frame is moveably coupled to the clamp element by a threadable engagement between the at least two lead screws with the internally threaded bores of the guiding elements.

Further preferably, the guided frame is moveable relative to the clamp element upon rotation of at least one of the at least two lead screws. Still further preferably, upon rotation of both of the at least two lead screws to the same rotational extent, the guided frame is urged to translate axially along the first axis. Yet further preferably, upon rotation of one of the at least two lead screws, the guided frame is angularly displaced relative to the longitudinal axis.

Preferably, upon rotation of the at least two lead screws to a different rotational extent, the guided frame is angularly displaced relative to the longitudinal axis. Further preferably, the guiding elements are moveable within sockets formed in the clamping element upon rotation of one of the at least two lead screws.

In accordance with an embodiment of the present invention, displacement of the guided frame relative to the clamp element provides for axial adjustment of the backrest along the first axis in increments ranging between 0.5-3 mm.

Preferably, the guided frame is automatically self-locked relative to the clamp element when not manipulated by a user, due to threadable engagement between the at least two lead screws and the at least two guiding elements.

Further preferably, the displacement of the guided frame relative to the clamp element provides for angular adjustment of the backrest with respect to the longitudinal axis in increments ranging between 0.5-3 degrees.

Still further preferably, at least one of the at least two lead screws has a bore through which a safety pin is inserted to positively lock the backrest in place.

In accordance with an embodiment of the present invention, an adjustment mechanism, including a fixedly positionable clamp element arranged along a longitudinal axis; a guided frame, which is selectively moveably coupled with respect to the fixedly positionable clamp element and being arranged along a first axis extending generally transversely with respect to the longitudinal axis; at least two lead screws arranged along respective second and third axes, each one of the at least two lead screws at least partially extending through the guided frame and extend along the second and third axes, which are generally parallel to the first axis; at least two guiding elements, each having an internally threaded bore; and wherein the guided frame is moveably coupled to the clamp element by a threadable engagement between the at least two lead screws with the internally threaded bores of the guiding elements.

Preferably, the guided frame is moveable relative to the clamp element upon rotation of at least one of the at least two lead screws. Further preferably, upon rotation of both of the at least two lead screws to the same rotational extent, the guided frame is urged to translate axially along the first axis. Still further preferably, upon rotation of one of the at least two lead screws, the guided frame is angularly displaced relative to the longitudinal axis. Yet further preferably, upon rotation of the at least two lead screws to a different rotational extent, the guided frame is angularly displaced relative to the longitudinal axis. Still further preferably, the guiding elements are moveable within at least one socket formed in the clamping element upon rotation of one of the at least two lead screws.

In accordance with an embodiment of the present invention, the guided frame is displaced axially along the first axis relative to the clamp element in increments ranging between 0.5-3 mm.

Preferably, the guided frame is automatically self-locked relative to the clamp element when not manipulated by a user, due to threadable engagement between the at least two lead screws and the at least two guiding elements.

Still preferably, the guided frame is displaced angularly with respect to the longitudinal axis and relative to the clamp element in increments ranging between 0.5-3 degrees.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The present invention will be understood and appreciated more fully from the following detailed description, taken in conjunction with the drawings in which.

DESCRIPTION OF EMBODIMENTS OF THE INVENTION

In accordance with an embodiment of the present invention, an improved backrest adjustment mechanism is provided, which enables both linear and angular adjustment of the backrest using a single adjustment mechanism, whereas the adjustment mechanism is preferably manually operated, without requiring any tools.

Figure 1:
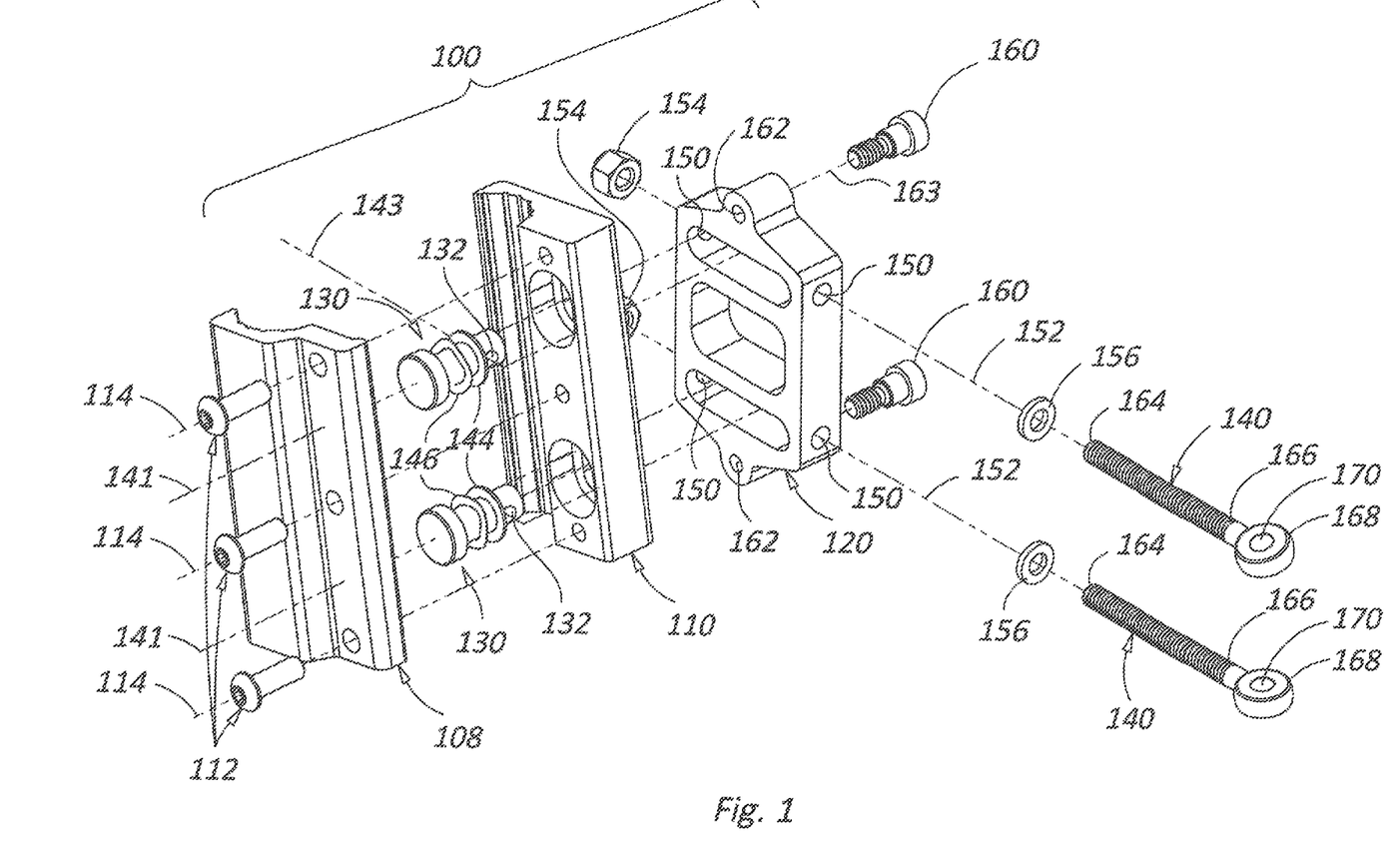
FIG. 1 is a simplified exploded pictorial view of an adjustment mechanism, constructed and operative in accordance with an embodiment of the present invention.

Reference is now made to FIG. 1, which is a simplified exploded pictorial view of an adjustment mechanism, constructed and operative in accordance with an embodiment of the present invention.

It is seen in FIG. 1 that an adjustment mechanism 100 preferably includes a first clamp element 108 and a second clamp element 110, which are configured to be fixedly coupled to each other by fasteners 112, which are generally arranged along longitudinal parallel axes 114. The adjustment mechanism 100 also includes a guided frame 120, which is configured to be moveably attached to the second clamp element 110 by means of typically two guiding elements 130, each of which has a respective internally threaded bore 132 adapted for insertion of an externally threaded lead screw 140 therethrough. The guiding elements 130 extend along generally parallel axes 141, which are preferably parallel to axis 114. The guiding elements 130 are movable coupled with respect to the second clamping element 110 and the guided frame 120. The internally threaded bores 132 generally extend along parallel axes 143, which extend generally transversely with respect to axes 141. It is seen that a washer 144 and a spring washer 146 are typically mounted onto each one of the guiding elements 130 and provide for tightening and secure coupling between the guided frame 120 and the clamp element 110 once the lead screws 140 are inserted into the respective internally threaded bores 132 of the guiding elements 130. It is noted that the washer 144 and the spring washer 146 are also used to provide for smooth slidable displacement of the guiding elements 130 within the respective portion of the clamp element 110, as described in detail hereinbelow.

It is further seen in FIG. 1 that typically two lead screws 140 are adapted to be inserted through respective bores 150 formed through the guided frame 120 and arranged along preferably parallel axes 152. Each of the lead screws 140 is axially fixedly mounted with respect to the guided frame 120 by means of a lock nut 154, which is preferably threadably connected to the first end of the lead screw 140. A washer 156 is typically mounted onto each of the lead screws 140 and positioned between the opposite second end of each of the lead screws 140 and the guided frame 120.

Typically, two fasteners 160 are threadably inserted into internally threaded apertures 162 formed in the guided frame 120 and arranged along axes 163, which extend generally transversely with respect to axes 152. Fasteners 160 are preferably used for attachment of the adjustment mechanism 100 to a backrest of a chair, as is further described hereinbelow.

It is noted that each of the lead screws 140 has a first end 164 and a second end 166. A grip element 168 extends from the second end 166. It is noted that the grip element 168 may be integrally made with the lead screw 140 or alternatively releasably attached thereto. It is seen in FIG. 1 that according to one embodiment of the present invention the grip element 168 includes a wide portion with a bore 170 formed therethrough.

It is a particular feature of an embodiment of the present invention that rotation of both of the threaded rods 140 to the same rotational extent about axes 152 causes axial movement of the guided frame 120 along axis 152, relative to the guiding elements 130. Rotation of one of the threaded rods 140 to a different rotational extent than the other causes angular displacement of the guided frame 120 with respect to axis 152, due to axial displacement of the guiding elements 130 along an axis that is perpendicular to axis 152 within sockets formed in the clamp element 110, which are configured to compensate for the angular displacement of the guided frame 120.

Figure 2A:
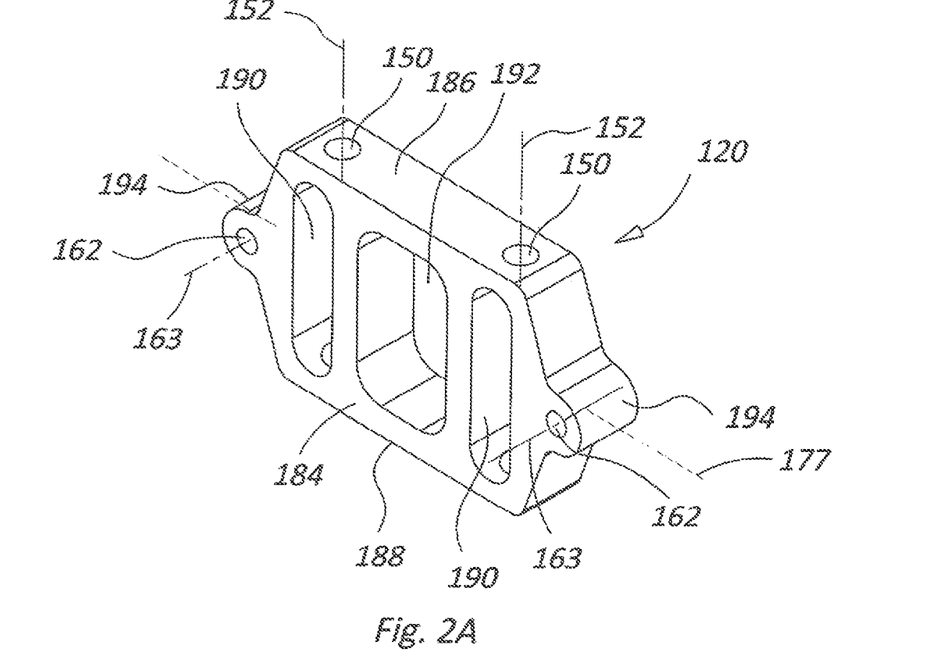
FIGS. 2A and 2B are respective simplified pictorial and plan views of a guided frame of the adjustment mechanism of FIG. 1.
Figure 2B:
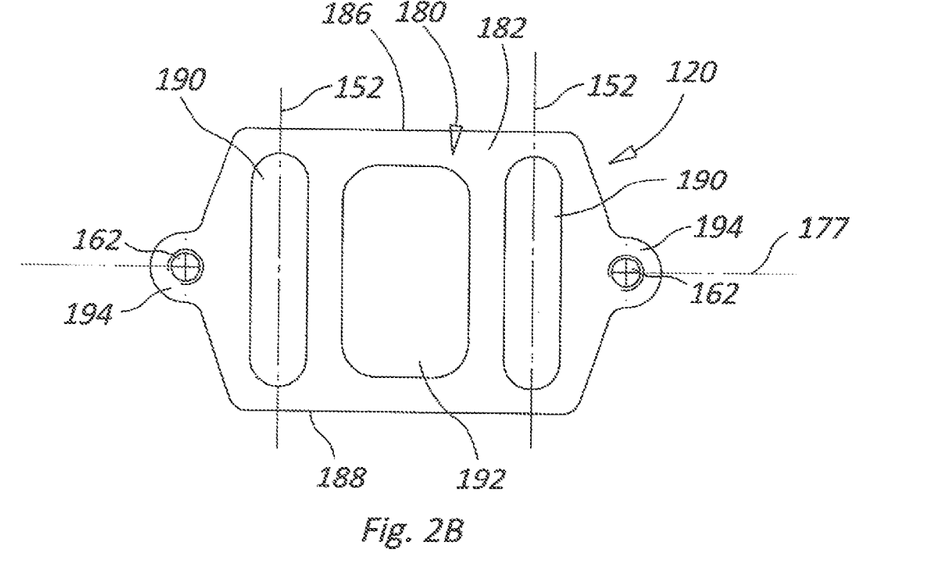

Reference is now made to FIGS. 2A and 2B, which are respective simplified pictorial and plan views of the guided frame 120 of the adjustment mechanism 100 of FIG. 1.

It is seen in FIGS. 2A and 2B that the guided frame 120 is a generally integrally made part, preferably made of steel and arranged along longitudinal axis 177. The guided frame 120 preferably includes a base portion 180 having a front wall 182 and a back wall 184, which are preferably connected by a first side wall 186 and a second side wall 188.

Preferably two parallel openings 190 are formed in the guided frame 120 and extend along axes 152 from a location that is generally adjacent to the first side wall 186 to a location that is generally adjacent to the second side wall 188. Each of bores 150 extends from the first side wall 186 to the second side wall 188 and communicates with the respective opening 190. A central opening 192 may be formed in the guided frame 120.

It is additionally seen in FIGS. 2A and 2B that ear portions 194 generally extend from opposite ends of the base portion 180 of the guided frame 120, in which apertures 162 are formed and extend along axes 163, as mentioned hereinabove with reference to FIG. 1. It is noted that apertures 162 are preferably internally threaded.

Figure 3A:
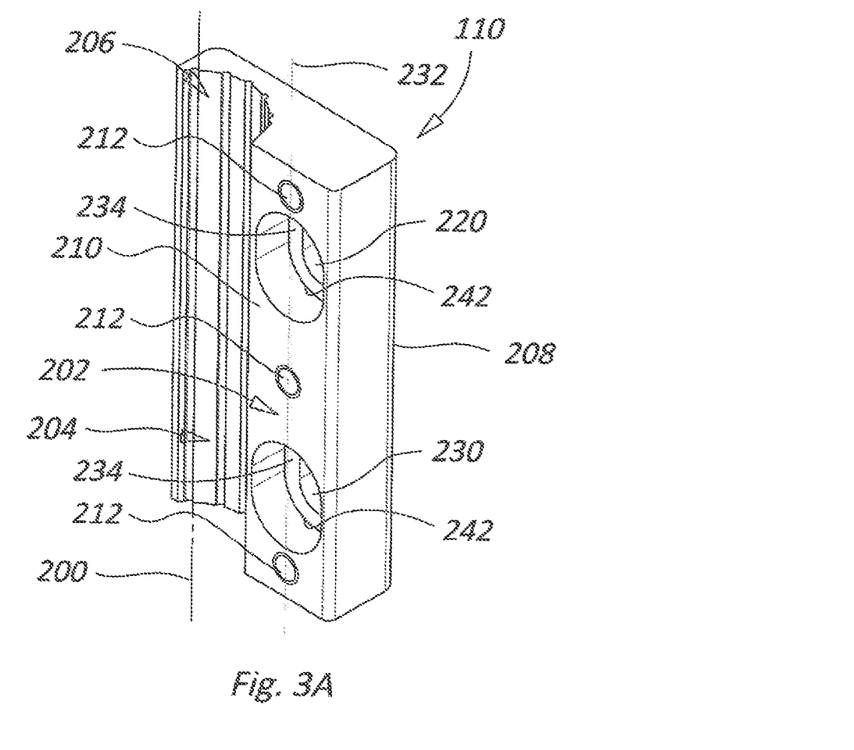
FIGS. 3A and 3B are respective simplified pictorial and plan views of a clamp element of the adjustment mechanism of FIG. 1.
Figure 3B:
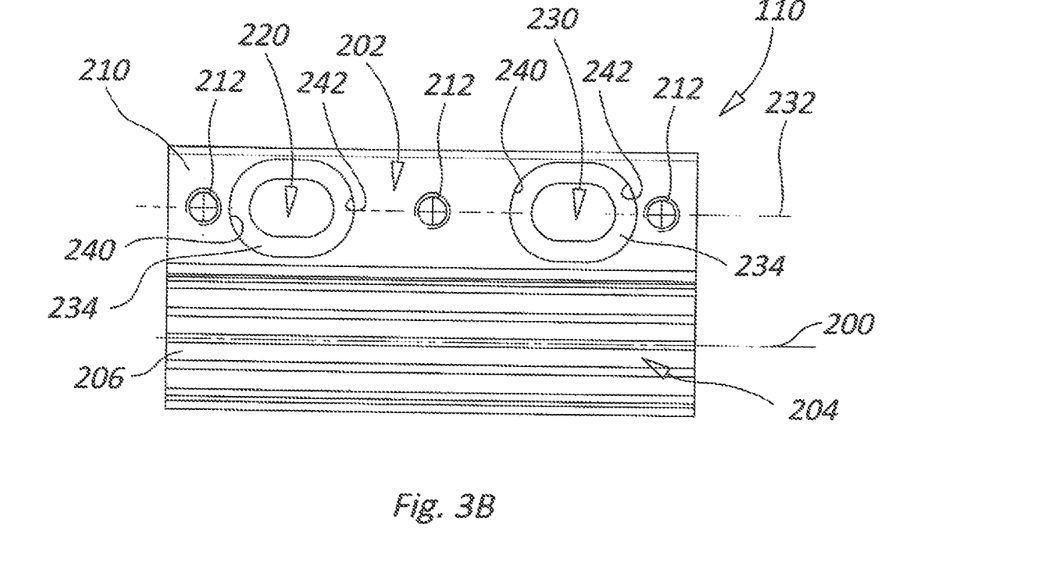

Reference is now made to FIGS. 3A and 3B, which are respective simplified pictorial and plan views of the clamp element 110 of the adjustment mechanism 100 of FIG. 1.

It is seen in FIGS. 3A and 3B that the second clamp element 110 is a generally integrally made part, preferably made of steel and arranged along longitudinal axis 200.

The second clamp element 110 preferably includes a base portion 202 and a gripping portion 204. The gripping portion 204 preferably has a generally concave surface 206.

The base portion 202 has a front wall 208 and a back wall 210 and preferably a plurality of internally threaded bores 212 are formed in the base portion 202 and extend from the front wall 208 to the back wall 210.

Typically, two longitudinal sockets 220 and 230 are formed in the back wall 210 and extend toward the front wall 208 of the second clamp element 110. Each of the sockets 220 and 230 extends generally longitudinally along an axis 232, which is parallel to axis 200. A backwardly facing shoulder 234 is defined by each of sockets 220 and 230 and located between the front wall 208 and the back wall 210. Each of the sockets 220 and 230 extends longitudinally along axis 232 from a first end 240 to a second end 242.

It is noted that the first clamp element 108 (not shown) is preferably similar to the second clamp element 110 in all respects, other than that the first clamp element 108 does not include sockets such as 220 and 230, which are described in detail hereinabove.

Figure 4A:
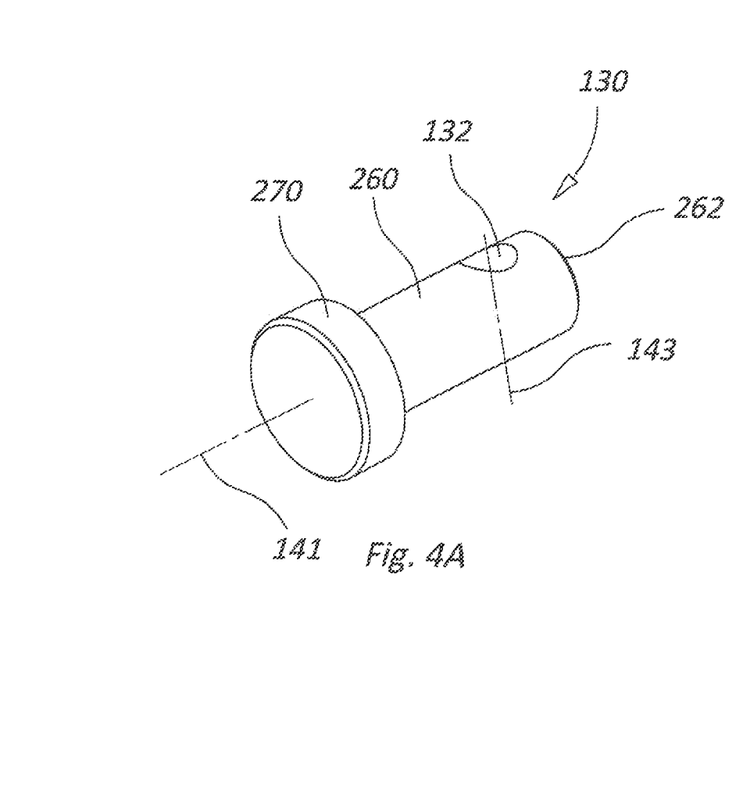
FIGS. 4A and 4B are respective simplified pictorial and plan view of a guiding element of the adjustment mechanism of FIG. 1.
Figure 4B:
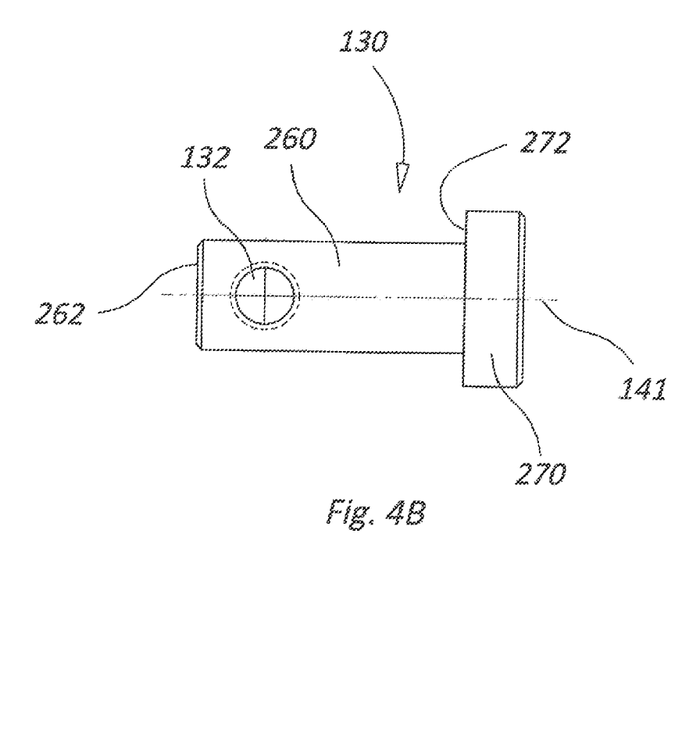

Reference is now made to FIGS. 4A and 4B, which are respective simplified pictorial and plan view of the guiding element 130 of the adjustment mechanism 100 of FIG. 1.

It is seen in FIGS. 4A and 4B that the guiding element 130 is a generally integrally made part, preferably made of steel and arranged along longitudinal axis 141. The guiding element 130 has a cylindrical portion 260 defining an end surface 262 and a head portion 270 at a second end thereof, which is preferably integrally connected to the cylindrical portion 260 and defining a shoulder surface 272 therebetween.

Internally threaded bore 132 is formed through the guiding element 130 and extends along axis 143 as mentioned hereinabove with reference to FIG. 1. The internally threaded bore 132 is preferably located adjacent to end surface 262.

Figure 5A:
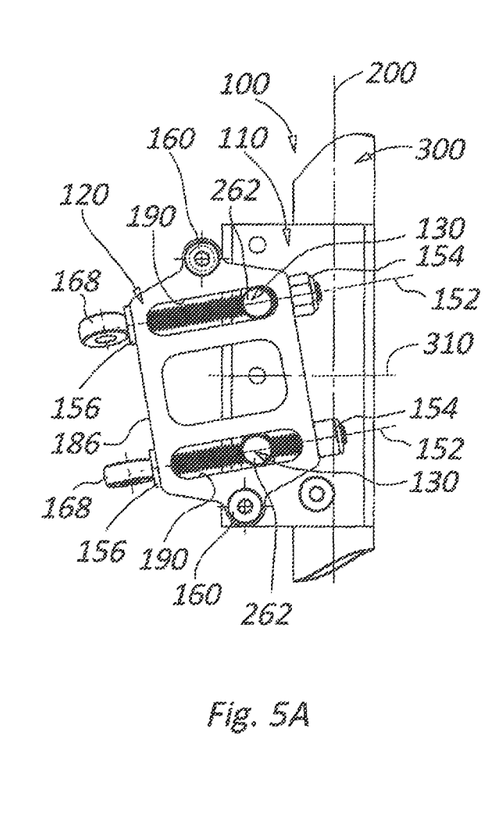
FIGS. 5A-5C are respective simplified forward plan view, backward plan view and a sectional view of an assembled adjustment mechanism of FIG. 1 mounted onto a portion of a chair frame, sectional view being taken along lines A-A in FIG. 5B.
Figure 5B:
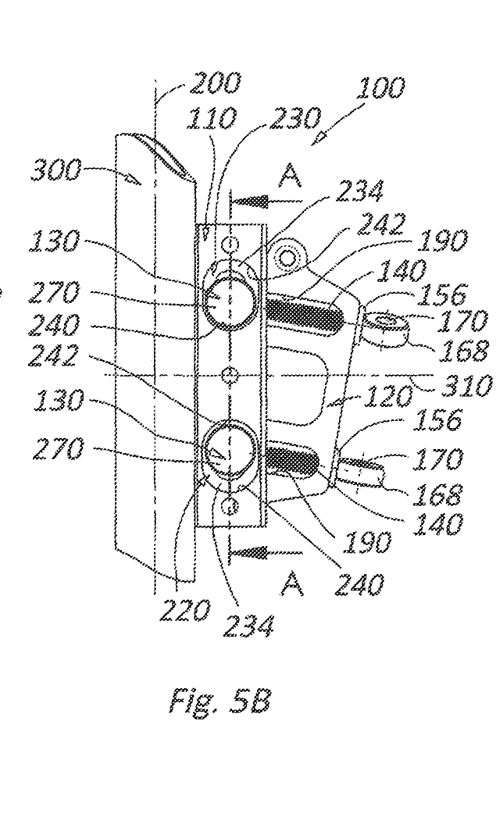
Figure 5C:
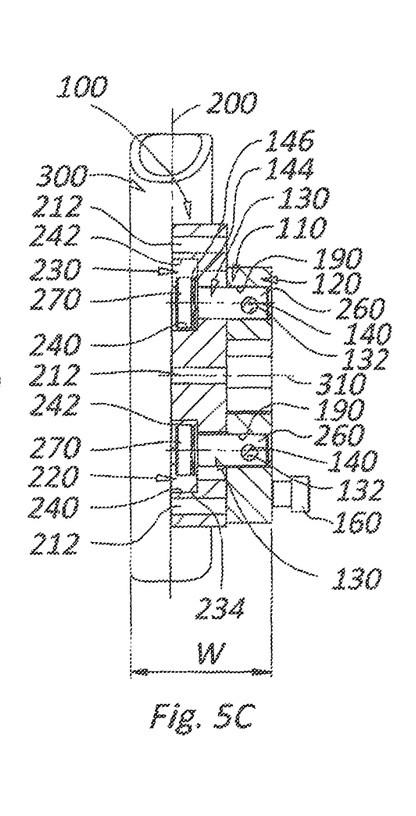

Reference is now made to FIGS. 5A-5C, which are respective simplified forward plan view, backward plan view and a sectional view of the assembled adjustment mechanism 100 of FIG. 1 mounted onto a portion of a chair frame, sectional view being taken along lines A-A in FIG. 5B.

It is seen in FIGS. 5A-5C that the second clamp element 110 is mounted onto a portion of a chair frame 300. It is noted that the first clamp element 108 (not shown) is adapted to be fixedly attached to the second clamp element 110 by means of fasteners 112 which are inserted through threaded bores 212 formed in both clamp elements 108 and 110, such that the gripping portions 204 of both clamp elements 108 and 110 engage the chair frame 300 and are securely and fixedly held with respect thereto. It is seen in FIGS. 5A-5C that the clamp portions 108 and 110 and the chair frame 300 are preferably arranged along mutual longitudinal axis 200.

It is a particular feature of an embodiment of the present invention that the guided frame 120 of the adjustment mechanism 100 is moveably coupled to the second clamp element 110, which is in turn fixedly coupled to the chair frame 300. The guided frame 120 is coupled to the second clamp element 110 in such manner that provides for both angular displacement of the guided frame 120 with respect to longitudinal axis 200 and axial displacement of the guided frame 120 relative to the chair frame 300 along axis 310, which extends generally transversely with respect to axis 300.

It is particularly seen in FIGS. 5A-5C that typically two guiding elements 130 are adapted to moveably couple the guided frame 120 to the second clamp element 110 via two lead screws 140, which are inserted through the respective threaded bores 132 of the two guiding elements 130. The guiding elements 130 are inserted through the clamp element 110, such that the head portion 270 of one guiding element is located within socket 220 of the clamp element 110 and the head portion 270 of the other guiding element is located within socket 230 of the clamp element 110. The guiding elements 130 are also inserted through the guided frame 120, such that the cylindrical portions 260 of the guiding elements 130 are partially located within respective openings 190 of the guided frame 120 and extend generally transversely with respect to axes 152. Two lead screws 140 extend axially along parallel axes 152, each of the lead screws 140 is inserted through respective bores 150 and openings 190 of the guided frame 120, and through the respective threaded bores 132 of the guiding elements 130. The lead screws 140 are axially fixedly attached with respect to the guided frame 120 by means of lock nuts 154 which are preferably threadably attached to the respective first ends 164 of lead screws 140. It is also seen that washers 156 are mounted between the respective grip element 168 of each of the lead screws 140 and between the side wall 186 of the guided frame 120. It is noted that the lead screws 140 can alternatively be axially fixedly attached to the guided frame 120 by means of any other type of fastener. The lead screws 140 are freely rotatable within the guided frame about respective axes 152.

It is a particular feature of an embodiment of the present invention that the guided frame 120 is moveable with respect to the clamp element 110 upon rotation of at least one of the lead screws 140. It is a further particular feature of an embodiment of the present invention that upon rotation of both lead screws 140 to the same rotational extent, the guided frame 120 is urged to translate axially relative to the chair frame 300 along axis 310, which extends generally transversely with respect to axis 310. It is an even further particular feature of an embodiment of the present invention that upon rotation of one of the lead screws 140 or alternatively upon rotation of both lead screws 140 to a different rotational extent, the guided frame 120 is urged to be tilted angularly relative to the chair frame 300, thus creating an angle with respect to axis 200.

Figure 6:
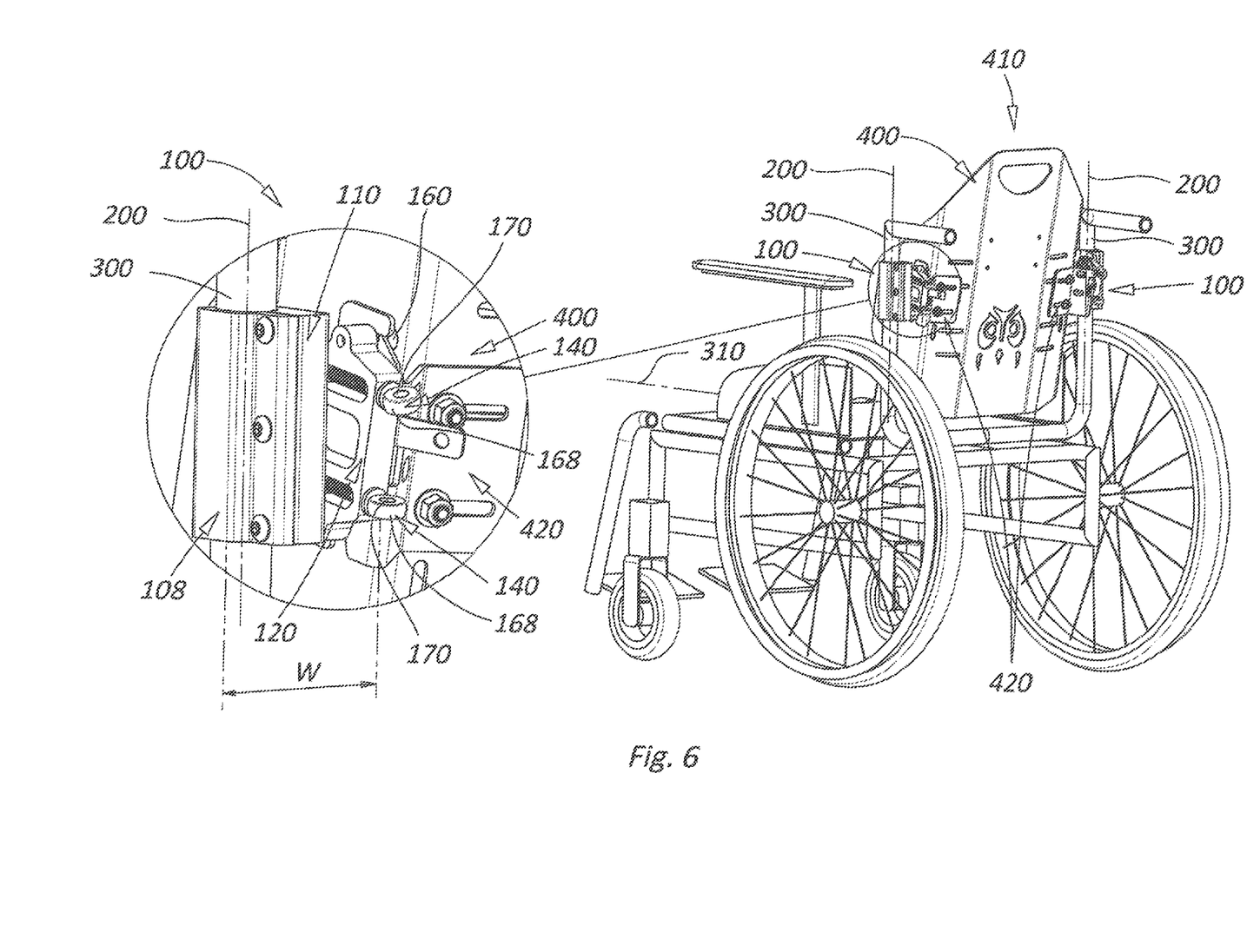
FIG. 6 is a simplified pictorial illustration of the assembled adjustment mechanism of FIG. 1 mounted onto a chair and a respective enlargement of the adjustment mechanism.

Reference is now made to FIG. 6, which is a simplified pictorial illustration of the assembled adjustment mechanism 100 of FIG. 1 mounted onto a chair and a respective enlargement of the adjustment mechanism.

It is seen in FIG. 6 that one adjustment mechanism 100 is preferably adapted to be mounted onto frame 300 adjacent to each side of a backrest 400 of a foldable chair 410.

It is appreciated by a person skilled in the art that the backrest 400 should be easily removable when the chair 410 needs to be folded down, thus the adjustment mechanism 100 has to be relatively small in order to enable proper folding of the chair 410. One adjustment mechanism 100 is thus mounted onto each of the vertical posts of the frame 300 in order to not interfere with the folding of chair 410, which posts extend along axes 200, as shown in FIG. 6.

It is noted that the assembled adjustment mechanism 100 has a width indicated by "W", as specifically shown in FIG. 5C and the enlargement of FIG. 6 and the width "W" is preferably smaller than 2.5" according to an embodiment of the present invention.

It is specifically seen in FIG. 6 that preferably one adjustment mechanism 100 is mounted between the frame 300 and the backrest 400 on each side of the backrest 400. It is noted that the frame 300 of the chair 410 is a static element, whereas the backrest 400 is adjustable, such that the backrest 400 may be axially translated along axis 310 as well as angularly tilted with respect to axis 200. It is noted that upon axial translation of the backrest 400 relative to the frame 300, the depth of the seat cushion of the chair 410 is adjusted and upon angular tilting of the backrest 400 relative to the frame 300, the inclination of the backrest 400 is adjusted.

It is a particular feature of an embodiment of the present invention as seen in FIG. 6 that the clamp elements 108 and 110 are fixedly attached to frame 300, the guided frame 120 is fixedly attached to the backrest 400, and the guided frame 120 is moveably attached to the second clamp element 110, thus resulting in moveable attachment of the guided frame 120 with respect to the frame 300 of the chair 410. Movement of the guided frame 120 relative to the clamp element 110 urges movement of the backrest 400 relative to the frame 300 due to the respective fixed attachments between clamp elements 108, 110 and the frame 300 and between the guided frame 120 and the backrest 400.

It is specifically seen that the guided frame 120 is fixedly attached to the backrest 400 by means of a connecting assembly 420, such that the connecting assembly 420 is fixedly mounted onto fasteners 160 of the guided frame 120.

Figure 7A:
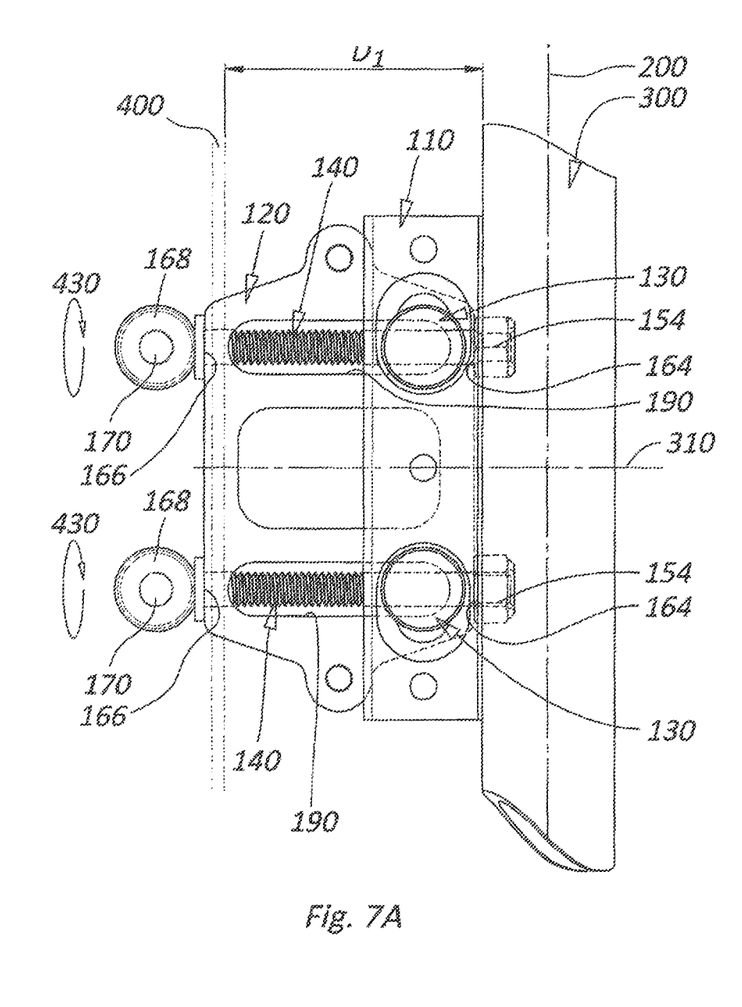
FIGS. 7A and 7B are two simplified backward plan views of the assembled adjustment mechanism of FIG. 1 shown in two different operative orientations during linear adjustment.
Figure 7B:
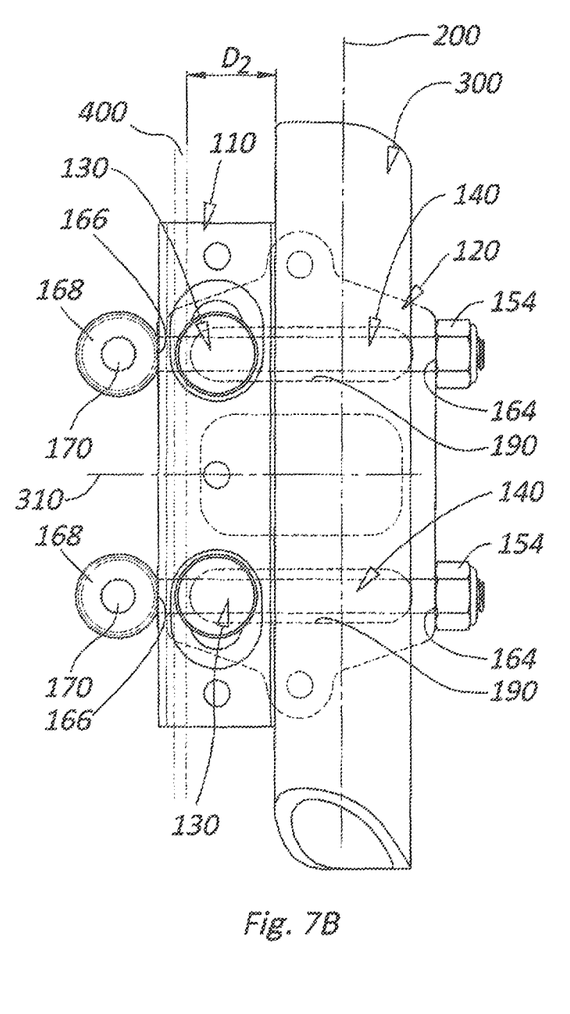

Reference is now made to FIGS. 7A and 7B, which are two simplified backward plan views of the assembled adjustment mechanism 100 of FIG. 1 shown in two different operative orientations during linear adjustment.

A schematic illustration of the adjustment mechanism 100 attached to a static element, such as a frame 300 and a moveable element such as backrest 400 is shown in FIGS. 7A & 7B. The adjustment mechanism 100 is shown in a first operative orientation in FIG. 7A, in which the backrest 400 is disposed at a distance D1 from the frame 300. The adjustment mechanism 100 is shown in a second operative orientation in FIG. 7B, in which the backrest 400 is disposed at a distance D2, which is preferably smaller than distance D1, from the frame 300.

It is seen in FIGS. 7A & 7B and described in detail hereinabove that the guided frame 120 is moveably attached to the clamp element 110, which is in turn fixedly attached to the static frame 300. The guided frame 120 is fixedly attached with respect to the moveable backrest 400. These spatial relationships between the guided frame 120, the clamp element 110, the frame 300 and the backrest 400 provide for relative movement between the frame 300 and the backrest 400. Axial displacement of the backrest 400 relative to the frame 300 along axis 310 is illustrated by the comparison of FIG. 7A and FIG. 7B.

It is a particular feature of an embodiment of the present invention that upon mutual rotation of both lead screws 140 to the same rotational extent in the direction of arrows 430, the backrest 400 is axially displaced along axis 310, thus the distance between the frame 300 and the backrest 400 changes from D1 (shown in FIG. 7A) to D2 (shown in FIG. 7B).

Upon rotation of both of the lead screws 140, the guided frame 120 is axially displaced along axis 310 relative to clamp element 110 due to the threaded engagement between the lead screws 140 and the respective bores 132 of the guiding elements 130. It is specifically seen in FIG. 7A that the guided frame 120 is disposed such that the first ends 164 of the lead screws 140 are located adjacent the guiding elements 130, whereas in FIG. 7B the guided frame 120 is axially translated such that the second ends 166 of the lead screws 140 are located adjacent the guiding elements 130, thus the guided frame 120 is displaced relative to the clamping element 110 in which the guiding elements 130 are mounted.

It is noted that the guiding elements 130 are static during axial displacement of the guided frame 120 along axis 310.

It is a particular feature of an embodiment of the present invention that the increments of axial displacement of the guided frame 120, and as a result of the backrest 400, are dependent on the pitch of the thread of the lead screws 140, and thus can be as small as 1 mm displacement or less. The displacement of the guided frame 120 due to threadable engagement between the lead screws 140 and the guiding elements 130 provides for fine adjustment of the backrest 400 using very small increments, preferably in the range of 0.5 mm-3 mm.

It is a further particular feature of an embodiment of the present invention that the adjustment mechanism 100 is automatically self-locked when not manipulated by the user, due to threadable engagement between the lead screws 140 and the guiding elements 130.

Figure 8A:
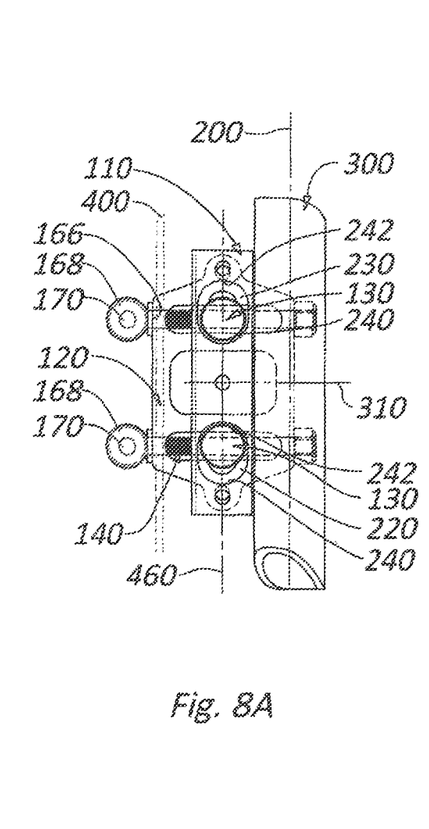
FIGS. 8A-8C are three simplified backward plan views of the assembled adjustment mechanism of FIG. 1 shown in three different operative orientations during angular adjustment.
Figure 8B:
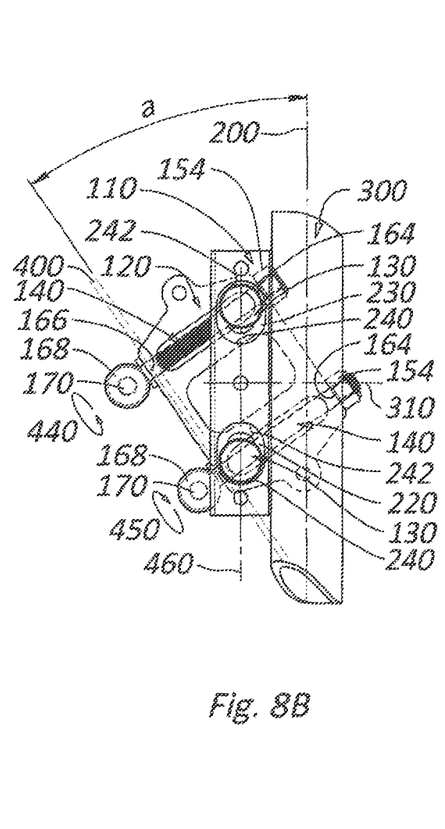
Figure 8C:
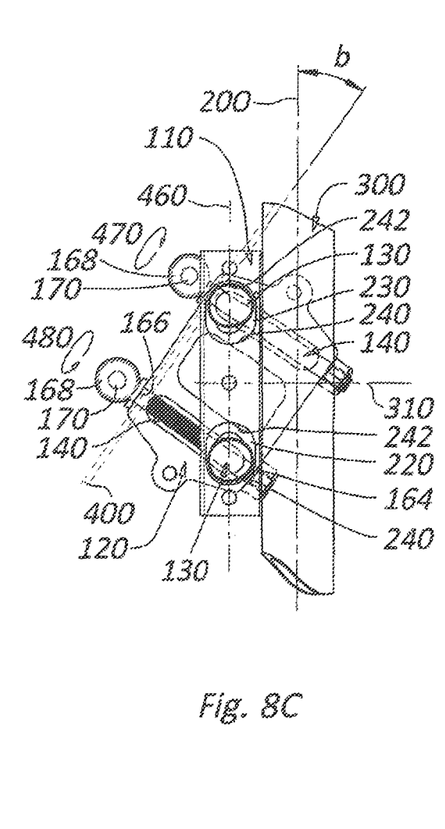

Reference is now made to FIGS. 8A-8C, which are three simplified backward plan views of the assembled adjustment mechanism 100 of FIG. 1 shown in three different operative orientations during angular adjustment.

A schematic illustration of the adjustment mechanism 100 attached to a static element, such as a frame 300 and a moveable element such as backrest 400 is shown in FIGS. 8A-8C. The adjustment mechanism 100 is shown in a third operative orientation in FIG. 8A, in which the backrest 400 is disposed in parallel to the frame 300 and extends along an axis which is parallel to axis 200. The adjustment mechanism 100 is shown in a fourth operative orientation in FIG. 8B, in which the backrest 400 is disposed at an angle "a" with respect to axis 200. The adjustment mechanism 100 is shown in a fifth operative orientation in FIG. 8C, in which the backrest 400 is disposed at an angle "b" with respect to axis 200.

It is seen in FIGS. 8A-8C and described in detail hereinabove that the guided frame 120 is moveably attached to the clamp element 110, which is in turn fixedly attached to the static frame 300. The guided frame 120 is fixedly attached with respect to the moveable backrest 400. These spatial relationships between the guided frame 120, the clamp element 110, the frame 300 and the backrest 400 provide for relative movement between the frame 300 and the backrest 400. Angular displacement of the backrest 400 relative to the frame 300 is illustrated by the comparison of FIGS. 8A, 8B and 8C.

It is a particular feature of an embodiment of the present invention that upon rotation of one of the lead screws 140 or upon rotation of one of the lead screws to a different rotational extent than the other in the direction of arrow 430, the backrest 400 is angularly tilted with respect to axis 200. In FIG. 8B, the backrest 400 is tilted at a first direction relative to axis 200, forming an angle "a" with respect to axis 200. In FIG. 8C, the backrest 400 is tilted at a second direction, opposite to the first direction, forming an angle "b" with respect to axis 200. Upon rotation of one of the lead screws 140, the guided frame 120 is angularly displaced with respect to axis 200 due to the threaded engagement between the lead screws 140 and the respective threaded bores 132 of the guiding elements 130.

It is specifically seen in FIG. 8A that the guided frame 120 is disposed such that the backrest 400, which is fixedly attached thereto is disposed in parallel to the axis 200 of the frame 300. In this third operative orientation, the first ends 164 of the lead screws 140 and the second ends 166 of the lead screws 140 are preferably equally spaced from the respective guiding elements 130.

In comparison to FIG. 8A, it is seen in FIG. 8B that upon rotation of one lead screw 140 in a first rotational direction indicated by arrow 440 and the other lead screw 140 in a second rotational direction indicated by arrow 450, opposite to the first rotational direction, the guided frame 120 is angularly displaced with respect to the clamp element 110 due to threadable engagement between the lead screws 140 and the guiding elements 130, thus urging angular displacement of the backrest 400 with respect to axis 200 and as a result forming an angle "a" between the backrest 400 and the frame 300. It is noted that alternatively, only one of the lead screws 140 can be rotated in order to angularly displace the guided frame 120 relative to the clamp element 110 and as a result tilting the backrest 400 to form an angle different than angle "a" between the backrest 400 and the frame 300. Further alternatively, both lead screws 140 can be rotated at the same rotational direction but to a different rotational extent in order to displace the guided frame 120 both angularly to form an angle between the backrest 400 and the frame 300 and axially along axis 310.

It is seen that angular displacement of the guided frame 120 with respect to axis 200 is enabled due to axial displacement of the guiding elements 130 along an axis 460, which is parallel to axis 200. It is specifically seen from a comparison of FIG. 8A and FIG. 8B that the guiding elements 130 are axially displaced along axis 460 within sockets 220 and 230 of the clamp element 110 in order to compensate for the angular inclination of the guided frame 120 with respect to axis 200. It is particularly seen in FIG. 8A that the guiding element 130 which is disposed in socket 220 of the clamp element 110 generally abuts end 240 of socket 220 and the guiding element 130 which is disposed in socket 230 of the clamp element 110 generally abuts end 242 of socket 230. In comparison, it is seen in FIG. 8B that upon rotation of the lead screws in the respective rotational directions indicated by arrows 440 and 450, the guiding elements 130 are axially displaced along axis 460. It is seen in FIG. 8B that the guiding element 130 which is disposed in socket 220 of the clamp element 110 now generally abuts end 242 of socket 220 and the guiding element 130 which is disposed in socket 230 of the clamp element 110 now generally abuts end 240 of socket 230. It is noted that alternatively, the lead screws 140 can be rotated to a smaller rotational extent, which would result in axial displacement of the guiding elements 130 along to a smaller axial extent, in which the guiding elements 130 would be positioned between ends 240 and 242 of the respective sockets 220 and 230 of the clamp element 110.

A first end position is illustrated in FIG. 8B, in which the maximal forward inclination of the backrest with respect to axis 200 is achieved. It is noted that any intermediate position forming an angle smaller than angle "a" can be achieved by rotating at least one of the lead screws 140 to a smaller rotational extent. It is noted that the maximal angle of backrest 400 inclination is preferably in the operative range of 0-45 degrees. It is appreciated that the maximal inclination extent depends on the length of the sockets 220 and 230 formed in clamp element 110, such that the longer the sockets 220 and 230 are along axis 460, the higher extent of backrest 400 inclination is, due to the fact that the guiding elements 130 can move to a greater linear extent and compensate for a larger angular inclination.

It is a particular feature of an embodiment of the present invention that the increments of angular displacement of the guided frame 120, and as a result of the backrest 400, are dependent on the pitch of the thread of the lead screws 140, and thus can be as small as 1 degree of inclination or less. The displacement of the guided frame 120 due to threadable engagement between the lead screws 140 and the guiding elements 130 provides for fine adjustment of the backrest 400 using very small increments, preferably in the range of 0.5-3 degrees.

It is a further particular feature of an embodiment of the present invention that the adjustment mechanism 100 is automatically self-locked when not manipulated by the user, due to threadable engagement between the lead screws 140 and the guiding elements 130.

In comparison to FIG. 8A, it is seen in FIG. 8C that upon rotation of one lead screw 140 in a first rotational direction indicated by arrow 470 and the other lead screw 140 in a second rotational direction indicated by arrow 480, opposite to the first rotational direction, the guided frame 120 is angularly displaced with respect to the clamp element 110 due to threadable engagement between the lead screws 140 and the guiding elements 130, thus urging angular displacement of the backrest 400 with respect to axis 200 and as a result forming an angle "b" between the backrest 400 and the frame 300. It is noted that alternatively, only one of the lead screws 140 can be rotated in order to angularly displace the guided frame 120 relative to the clamp element 110 and as a result tilting the backrest 400 to form an angle different than angle "b" between the backrest 400 and the frame 300. Further alternatively, both lead screws 140 can be rotated at the same rotational direction but to a different rotational extent in order to displace the guided frame 120 both angularly to form an angle between the backrest 400 and the frame 300 and axially along axis 310.

It is seen that angular displacement of the guided frame 120 with respect to axis 200 is enabled due to axial displacement of the guiding elements 130 along axis 460, which is parallel to axis 200. It is specifically seen from a comparison of FIG. 8A and FIG. 8C that the guiding elements 130 are axially displaced along axis 460 within sockets 220 and 230 of the clamp element 110 in order to compensate for the angular inclination of the guided frame 120 with respect to axis 200. It is particularly seen in FIG. 8A that the guiding element 130 which is disposed in socket 220 of the clamp element 110 generally abuts end 240 of socket 220 and the guiding element 130 which is disposed in socket 230 of the clamp element 110 generally abuts end 242 of socket 230. In comparison, it is seen in FIG. 8C that upon rotation of the lead screws in the respective rotational directions indicated by arrows 470 and 480, the guiding elements 130 are axially displaced along axis 460. It is seen in FIG. 8C that the guiding element 130 which is disposed in socket 220 of the clamp element 110 now generally abuts end 242 of socket 220 and the guiding element 130 which is disposed in socket 230 of the clamp element 110 now generally abuts end 240 of socket 230. It is noted that alternatively, the lead screws 140 can be rotated to a smaller rotational extent, which would result in axial displacement of the guiding elements 130 along to a smaller axial extent, in which the guiding elements 130 would be positioned between ends 240 and 242 of the respective sockets 220 and 230 of the clamp element 110.

A second end position is illustrated in FIG. 8C, in which the maximal backward inclination of the backrest with respect to axis 200 is achieved. It is noted that any intermediate position forming an angle smaller than angle "b" can be achieved by rotating at least one of the lead screws 140 to a smaller rotational extent. It is noted that the maximal angle of backrest 400 inclination is preferably in the operative range of 0-45 degrees. It is appreciated that the maximal inclination extent depends on the length of the sockets 220 and 230 formed in clamp element 110, such that the longer the sockets 220 and 230 are along axis 460, the higher extent of backrest 400 inclination is, due to the fact that the guiding elements 130 can move to a greater linear extent and compensate for a larger angular inclination.

It is a particular feature of an embodiment of the present invention that the increments of angular displacement of the guided frame 120, and as a result of the backrest 400, are dependent on the pitch of the thread of the lead screws 140, and thus can be as small as 1 degree of inclination or less. The displacement of the guided frame 120 due to threadable engagement between the lead screws 140 and the guiding elements 130 provides for fine adjustment of the backrest 400 using very small increments, preferably in the range of 0.5-3 degrees.

It is a further particular feature of an embodiment of the present invention that the adjustment mechanism 100 is automatically self-locked when not manipulated by the user, due to threadable engagement between the lead screws 140 and the guiding elements 130.

It is a particular feature of an embodiment of the present invention that the backrest can be positively locked by means of adding a safety feature such as a safety pin (not shown) that is inserted through the bores 170 formed in the two lead screws 140 of the adjustment mechanisms 100 mounted onto both sides of the backrest 400 as seen in FIG. 6, in order to prevent any inadvertent manipulation of the lead screws and additionally provide an additional safety measure for heavy people which apply a high amount of force on the backrest 400. In this case, pin insertion through bores 170 of the lead screws prevents inadvertent unlocking between the lead screws 140 and the guiding elements 130.

It will be appreciated by persons skilled in the art that the present invention is not limited by what has been particularly shown and described hereinabove. Rather the scope of the present invention includes both combinations and sub-combinations of various features described hereinabove as well as variations and modifications thereof which are not in the prior art.

The invention claimed is:
1. An adjustment mechanism configured for adjusting a backrest of a chair, comprising:
a clamp element configured to be fixedly attached to a static frame, which extends along a longitudinal axis;
a guided frame selectively moveably coupled to said clamp element and configured to be fixedly attached to said backrest, and
wherein displacement of said guided frame relative to said clamp element is configured to cause corresponding displacement of said backrest either axially along a first axis extending generally transversely with respect to said longitudinal axis or angularly with respect to said longitudinal axis;
at least two lead screws at least partially extend through said guided frame and extend along second and third axes, which are generally parallel to said first axis;
at least two guiding elements, each having an internally threaded bore;
and wherein said guided frame is moveably coupled to said clamp element by a threadable engagement between said at least two lead screws with said internally threaded bores of said guiding elements; and
wherein upon rotation of both of said at least two lead screws to the same rotational extent, the guided frame is urged to translate axially along said first axis.

2. The adjustment mechanism according to claim 1, wherein said guided frame is moveable relative to said clamp element upon rotation of at least one of said at least two lead screws.

3. The adjustment mechanism according to claim 1, wherein upon rotation of one of said at least two lead screws, the guided frame is angularly displaced relative to said longitudinal axis.

4. The adjustment mechanism according to claim 1, wherein upon rotation of said at least two lead screws to a different rotational extent, the guided frame is angularly displaced relative to said longitudinal axis.

5. The adjustment mechanism according to claim 1, wherein said guiding elements are moveable within sockets formed in said clamping element upon rotation of one of said at least two lead screws.

6. The adjustment mechanism according to claim 1, wherein said displacement of said guided frame relative to said clamp element provides for axial adjustment of said backrest along said first axis in increments ranging between 0.5-3 mm.

7. The adjustment mechanism according to claim 1, wherein said guided frame is automatically self-locked relative to said clamp element when not manipulated by a user, due to threadable engagement between said at least two lead screws and said at least two guiding elements.

8. The adjustment mechanism according to claim 1, wherein said displacement of said guided frame relative to said clamp element provides for angular adjustment of said backrest with respect to said longitudinal axis in increments ranging between 0.5-3 degrees.

9. An adjustment mechanism configured for adjusting a backrest of a chair, comprising:
a clamp element configured to be fixedly attached to a static frame, which extends along a longitudinal axis;
a guided frame selectively moveably coupled to said clamp element and configured to be fixedly attached to said backrest, and
wherein displacement of said guided frame relative to said clamp element is configured to cause corresponding displacement of said backrest either axially along a first axis extending generally transversely with respect to said longitudinal axis or angularly with respect to said longitudinal axis;

at least two lead screws at least partially extend through said guided frame and extend along second and third axes, which are generally parallel to said first axis;

at least two guiding elements, each having an internally threaded bore;

and wherein said guided frame is moveably coupled to said clamp element by a threadable engagement between said at least two lead screws with said internally threaded bores of said guiding elements; and wherein at least one of said at least two lead screws has a bore through which a safety pin is inserted to positively lock said backrest in place.

10. An adjustment mechanism, comprising:

a fixedly positionable clamp element arranged along a longitudinal axis;

a guided frame, which is selectively moveably coupled with respect to said fixedly positionable clamp element and being arranged along a first axis extending generally transversely with respect to said longitudinal axis;

at least two lead screws arranged along respective second and third axes, each one of said at least two lead screws at least partially extending through said guided frame and extend along said second and third axes, which are generally parallel to said first axis;

at least two guiding elements, each having an internally threaded bore; and wherein said guided frame is moveably coupled to said clamp element by a threadable engagement between said at least two lead screws with said internally threaded bores of said guiding elements; wherein upon rotation of both of said at least two lead screws to the same rotational extent, the guided frame is urged to translate axially along said first axis.

11. The adjustment mechanism according to claim 10, wherein said guided frame is moveable relative to said clamp element upon rotation of at least one of said at least two lead screws.

12. The adjustment mechanism according to claim 10, wherein upon rotation of one of said at least two lead screws, the guided frame is angularly displaced relative to said longitudinal axis.

13. The adjustment mechanism according to claim 10, wherein upon rotation of said at least two lead screws to a different rotational extent, the guided frame is angularly displaced relative to said longitudinal axis.

14. The adjustment mechanism according to claim 10, wherein said guiding elements are moveable within at least one socket foamed in said clamping element upon rotation of one of said at least two lead screws.

15. The adjustment mechanism according to claim 10, wherein said guided frame is displaced axially along said first axis relative to said clamp element in increments ranging between 0.5-3 mm.

16. The adjustment mechanism according to claim 10, wherein said guided frame is automatically self-locked relative to said clamp element when not manipulated by a user, due to threadable engagement between said at least two lead screws and said at least two guiding elements.

17. The adjustment mechanism according to claim 10, wherein said guided frame is displaced angularly with respect to said longitudinal axis and relative to said clamp element in increments ranging between 0.5-3 degrees.

* * * * *